UNITED STATES PATENT OFFICE.

HALLET RICE ROBBINS, OF WASHINGTON, DISTRICT OF COLUMBIA, ASSIGNOR TO METALS RECOVERY COMPANY, OF NEW YORK, N. Y., A CORPORATION OF MAINE.

CONCENTRATION OF ORES.

1,397,703.  Specification of Letters Patent.  Patented Nov. 22, 1921.

No Drawing.  Application filed August 30, 1917. Serial No. 188,943.

*To all whom it may concern:*

Be it known that I, HALLET RICE ROBBINS, a citizen of the United States, residing at Washington, District of Columbia, have invented certain new and useful Improvements in the Concentration of Ores, of which the following is a specification.

This invention relates to the separation, by mechanical and physical means, of valuable constituents of ores of metals, and is based primarily on an original discovery of differences in the flotative properties of certain minerals, particularly chalcopyrite and cupriferous pyrite on the one hand, and pyrrhotite and pyrite nearly or wholly free from copper on the other; and of new and hitherto unused means for utilizing these delicately differentiated flotative properties, to effect a commercially efficient separation of valuable minerals from those less valuable.

It has long been known that certain minerals, particularly metallic sulfids, will float in a scum, foam, or froth when suitably brought into contact with bubbles of air or other gas in a freely-flowing pulp composed of the finely-ground ore, containing the sulfids, and water, modified by oily or other organic substances, either dissolved, emulsified, or finely divided and suspended in the water.

According to the procedure of this prior art, it is difficult to obtain an efficient separation of one sulfid from another, although it is usually easy to separate nearly all of the different sulfids or metallic minerals in an ore, together, from the greater part of the gangue; in this case, however, practical difficulties are encountered in handling the tough, persistent and voluminous froths formed.

In the prior art, to separate one sulfid or metallic mineral from another by flotation, it has been customary to effect some superficial alteration of the surfaces of the particles of one of the mixed sulfids, in order to change their action with, or affinity for, oily or organic frothing agents. This superficial alteration usually consists in a slight oxidation of the particles of one sulfid, either by roasting at a temperature at which the particles of another sulfid are not affected; or by the use of soluble oxidizing agents such as permanganates or bichromates, suitably diluted solutions of which act upon certain sulfids, but not upon others.

These crude and costly methods can be and are used on fairly rich ores of lead and zinc, but are a failure, both commercially and metallurgically, in the case of copper ores, especially low-grade copper ores containing pyrite or pyrrhotite.

I have discovered that when copper ores, finely pulverized, are mixed with water containing in solution a non-alkaline electrolyte, air or gas being thoroughly disseminated through the freely-flowing pulp formed by the ore and aqueous solution of electrolyte, a foam rises to the surface of the pulp, which foam possesses peculiar and valuable properties; that is to say it raises to its upper surface substantially all of the mineral containing copper, while only a very small amount of gangue or other sulfids present are raised in the foam. The foam is of sufficient strength to hold the copper-containing mineral until it may be recovered by skimming or by permitting the foam to overflow; yet it breaks down readily after being skimmed, or overflowing, thus exhibiting a great advantage over most froths formed by the use of oily substances.

The copper-containing mineral raised by the practice of my invention is usually accompanied by less gangue, than when oily or organic frothing agents are used.

Among the non-alkaline electrolytes which I have used successfully are sodium chlorid, sulfate, sulfite, and thiosulfate; magnesium chlorid and sulfate; calcium chlorid; ammonium chlorid; also sulfuric acid. I have found the mixture of sodium and magnesium chlorid, accompanied by minute amounts of other salts, occurring in ordinary sea water, to give excellent results.

I am aware that certain inorganic salts or electrolytes have been used as reagents in ore flotation, but usually to modify the action of some oily or organic reagent concurrently or subsequently used in the process; and never alone, to form a foam of proper strength and texture to permit clean mineral to be recovered from it.

I am also aware that a process has been patented U. S. 1,155,861, Canadian 164,587, for the flotation of mineral particles by bubbles of gas, without the use of oily or organic frothing agents, but in this case no foam is formed and the rising bubbles discharge their load beneath the surface of the pulp, the concentrate being contaminated by a certain amount of the crude ore pulp, unavoidably withdrawn from the apparatus with it. Furthermore there is no preferential flotation of one particular sulfid in the presence of others.

I make no claim to any particular method of disseminating gas through the ore pulp, the only requirement in this respect, for the successful working of my invention, being that the dissemination of fine gas bubbles must be thorough, so that all particles of the ore may be brought into close contact with them.

Following are several particular examples of the working of my invention. In each case the ore was ground to pass a sieve with 100 meshes to the linear inch and 500 grams were agitated with about 2000 cubic centimeters of water, in a Janney flotation machine. The foam which rose to the surface of the spitzkasten of the machine was skimmed off, the first portion being designated "concentrates," the last portion "middling" and the material remaining in the apparatus, "tailings." Each of these three products was dried, weighed and assayed.

No. 1. Ordinary sea water. Concentrates collected during three minutes. Middlings during following seventeen minutes. Heads contained about 7% cupriferous pyrite and 9% pyrrhotite.

*Results.*

| Product. | Weight (grams). | Assay (per cent.). | | | |
|---|---|---|---|---|---|
| | | Copper. | Iron. | Sulfur. | Insoluble. |
| Heads......... | 500 | 1.75 | 18.9 | 5.9 | 47.4 |
| Concentrates.. | 39 | 21.61 | 34.3 | 31.2 | 6.4 |
| Middlings..... | 39 | 0.71 | 34.9 | 16.2 | 26.0 |
| Tailings....... | 421 | 0.09 | 15.2 | 2.6 | 56.6 |

No. 2. Another sample of clean sea water. Same heads as Test No. 1. Concentrates collected during three minutes. Middlings collected during following twelve minutes.

*Results.*

| Product. | Weight (grams). | Assay (per cent.). | | | |
|---|---|---|---|---|---|
| | | Copper. | Iron. | Sulfur. | Insoluble. |
| Concentrates.. | 36 | 21.81 | 30.7 | 28.2 | 7.4 |
| Middlings..... | 28 | 1.24 | 33.8 | 15.0 | 22.8 |
| Tailings....... | 427 | 0.15 | 16.0 | 3.6 | 55.8 |

No. 3. Ordinary fresh water to which was added 15 grams common salt (sodium chlorid.) Same heads as in previous tests. Concentrates collected during seven minutes. Middlings during following fourteen minutes.

*Results.*

| Product. | Weight (grams). | Assay (per cent.). | | | |
|---|---|---|---|---|---|
| | | Copper. | Iron. | Sulfur. | Insoluble. |
| Concentrates.. | 56 | 15.35 | 28.3 | 23.9 | 16.6 |
| Middlings..... | 24 | 0.72 | 32.5 | 15.1 | 30.4 |
| Tailings....... | 417 | 0.07 | 16.4 | 3.2 | 53.4 |

No. 4. Ordinary fresh water to which were added 11 gms. soda ash (sodium carbonate.) Same heads as previous tests. Concentrates collected during five minutes. Middlings collected during following ten minutes.

*Results.*

| Product. | Weight (grams). | Assay (per cent.). | | | |
|---|---|---|---|---|---|
| | | Copper. | Iron. | Sulfur. | Insoluble. |
| Concentrates.. | 32 | 23.98 | 35.3 | 31.2 | 4.6 |
| Middlings..... | 23 | 1.58 | 25.3 | 9.6 | 37.6 |
| Tailings....... | 441 | 0.19 | 18.4 | 4.0 | 53.1 |

No. 5. Ordinary fresh water with 20 grams sodium sulfite. Same heads as previous tests. Concentrates collected during five minutes. Middlings collected during following ten minutes.

*Results.*

| Product. | Weight (grams). | Assay (per cent.). | | | |
|---|---|---|---|---|---|
| | | Copper. | Iron. | Sulfur. | Insoluble. |
| Concentrates.. | 23.5 | 26.35 | 30.5 | 29.4 | 5.2 |
| Middlings..... | 17 | 2.97 | 20.0 | 7.3 | 39.6 |
| Tailings....... | 455 | 0.49 | 18.5 | 5.2 | 50.6 |

No. 6. Ordinary fresh water with 15 gms. epsom salts (magnesium sulfate cryst.) Same heads as in previous tests. Concentrates collected during five minutes. Middlings collected during following ten minutes.

*Results.*

| Product. | Weight (grams). | Assay (per cent.). | | | |
|---|---|---|---|---|---|
| | | Copper. | Iron. | Sulfur. | Insoluble. |
| Concentrates.. | 31.0 | 20.80 | 28.1 | 26.2 | 11.4 |
| Middlings..... | 24.5 | 2.78 | 27.6 | 12.6 | 30.4 |
| Tailings....... | 441.5 | 0.43 | 17.8 | 4.4 | 48.6 |

No. 7. Ordinary fresh water with 30 gms. magnesium chlorid. Same heads as in previous tests. Concentrates collected during five minutes. Middlings collected during following ten minutes.

*Results.*

| Product. | Weight (grams). | Assay (per cent.). | | | |
|---|---|---|---|---|---|
| | | Copper. | Iron. | Sulfur. | Insoluble. |
| Concentrates.. | 33 | 23.68 | 31.3 | 29.4 | 5.4 |
| Middlings..... | 29 | 1.32 | 27.0 | 10.6 | 32.4 |
| Tailings....... | 440 | 0.26 | 16.7 | 3.8 | 51.4 |

No. 8. Ordinary fresh water with 20 grams calcium chlorid. Same heads as in previous tests. Concentrates collected during five minutes. Middlings during following ten minutes.

*Results.*

| Product. | Weight (grams). | Assay (per cent.). | | | |
|---|---|---|---|---|---|
| | | Copper. | Iron. | Sulfur. | Insoluble. |
| Concentrates.. | 36 | 23.08 | 30.7 | 28.9 | 6.0 |
| Middlings..... | 23 | 1.58 | 28.3 | 11.9 | 31.2 |
| Tailings....... | 440 | 0.15 | 17.3 | 4.0 | 51.1 |

No. 9. Ordinary fresh water with 30 gms. sal ammoniac (ammonium chlorid.) Same heads as in previous tests. Concentrates collected during five minutes. Middlings collected during following ten minutes.

*Results.*

| Product. | Weight (grams). | Assay (per cent.). | | | |
|---|---|---|---|---|---|
| | | Copper. | Iron. | Sulfur. | Insoluble. |
| Concentrates.. | 39.5 | 21.12 | 34.0 | 30.8 | 5.0 |
| Middlings..... | 25.5 | 0.81 | 28.6 | 12.2 | 32.0 |
| Tailings....... | 421.5 | 0.13 | 16.1 | 3.3 | 54.6 |

I claim:—

1. In a process of concentrating ores containing a sulfid of copper, the operations of forming a freely flowing pulp of such ore reduced to a floatable size, adding a non-alkaline salt to said pulp without organic frothing agent, produeing fine air bubbles in the pulp, causing the air bubbles so formed to collect at the surface of the pulp with sulfid of copper adhering thereto, and separating said bubbles and the adhering mineral from the remainder of the pulp containing the gangue which does not adhere to the bubbles.

2. In a process of concentrating ores containing a sulfid of copper, the operations of forming a freely flowing pulp of such ore reduced to a floatable size and containing sea water without the addition of organic frothing agent, producing fine air bubbles in the pulp, causing the air bubbles so formed to collect at the surface of the pulp with sulfid of copper adhering thereto, and separating the said bubbles and the adhering mineral from the remainder of the pulp containing the gangue which does not adhere to the bubbles.

3. A process of concentrating ores containing sulfids of copper and iron comprising the operations of forming a freely flowing pulp of such ore containing the sulfid of copper reduced to a floatable size, adding a non-alkaline salt to said pulp without organic frothing agent, producing fine air bubbles in the pulp, causing the air bubbles so formed to collect at the surface of the pulp with sulfid of copper adhering thereto, and separating said bubbles with the adhering mineral from the gangue and sulfid of iron remaining in the pulp.

4. A process of concentrating ores containing sulfids of copper and iron comprising the operations of forming a freely flowing pulp of such ore containing the sulfid of copper reduced to a floatable size and containing sea water without the addition of organic frothing agent, producing fine air bubbles in the pulp, causing the air bubbles so formed to collect at the surface of the pulp with sulfid of copper adhering thereto, and separating said bubbles with the adhering mineral from the gangue and sulfid of iron remaining in the pulp.

In testimony whereof, I have subscribed my name.

HALLET RICE ROBBINS.